March 20, 1945. L. HERMANI 2,371,888
ARTICLE CONVEYING AND UPRIGHTING APPARATUS
Filed July 1, 1942 2 Sheets-Sheet 2
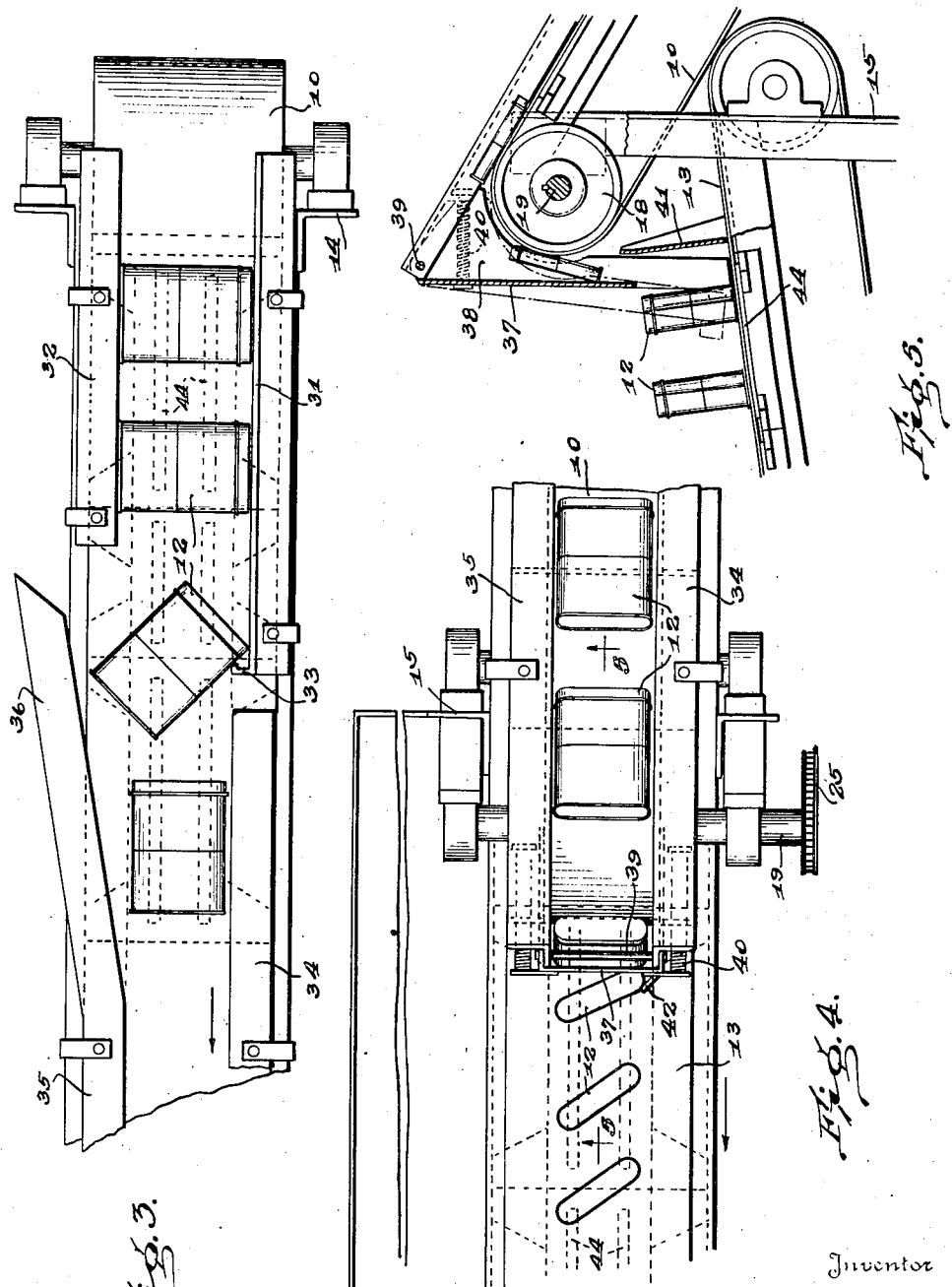

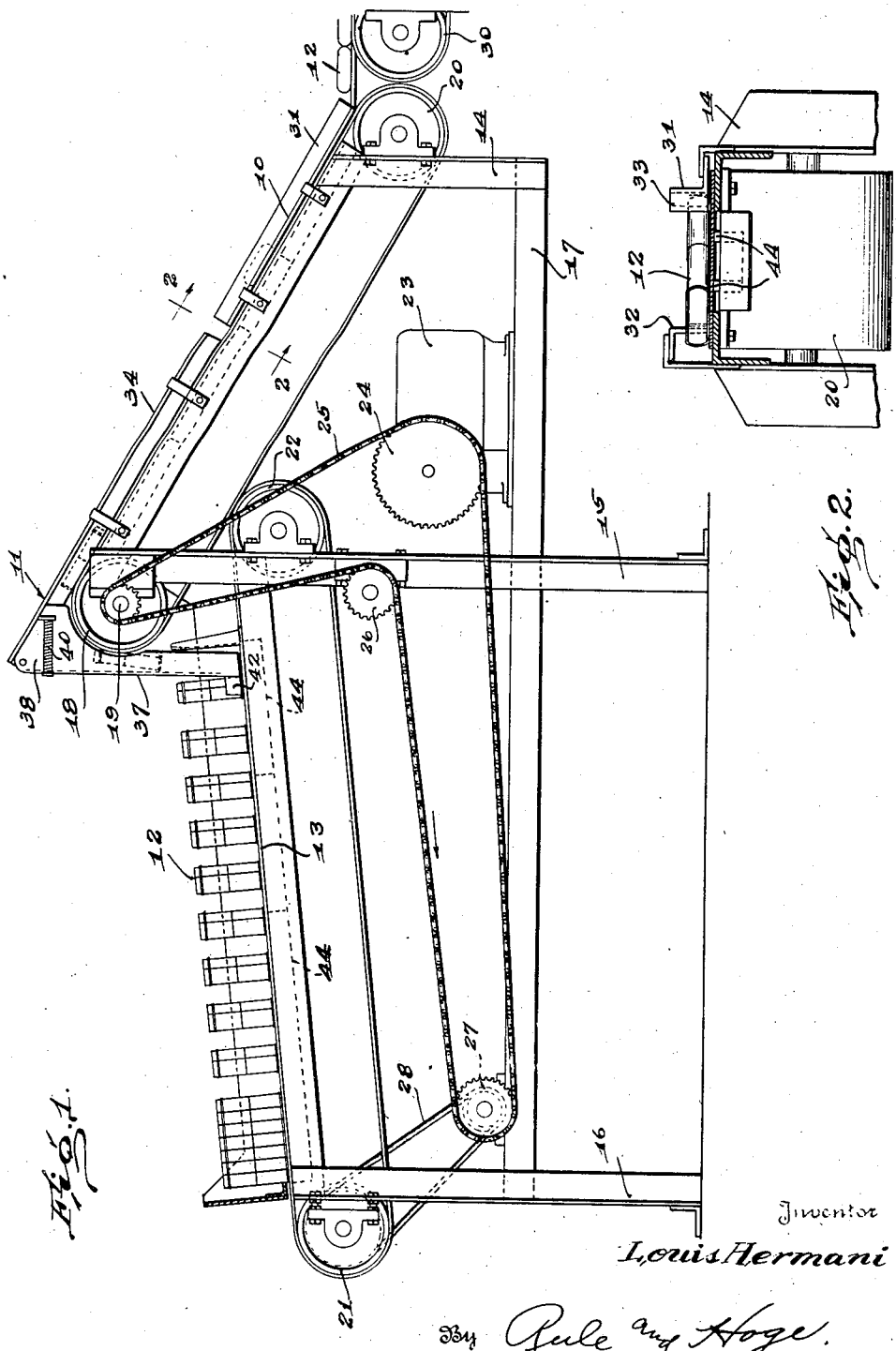

Patented Mar. 20, 1945

2,371,888

UNITED STATES PATENT OFFICE 2,371,888

ARTICLE CONVEYING AND UPRIGHTING APPARATUS

Louis Hermani, Baltimore, Md., assignor, by mesne assignments, to Continental Can Company, Inc., New York, N. Y., a corporation of New York Application July 1, 1942, Serial No. 449,246

7 Claims. (Cl. 198—33)

My invention relates to an apparatus adapted for receiving articles such as flat cans and the like while lying on their sides or in a recumbent position, conveying them from one point to another, rearranging the articles while being thus conveyed and placing them in upright position on the conveyor.

An object of the invention is to provide a simple and practical apparatus for receiving the articles and arranging them in a convenient manner for handling.

Other objects of the invention will appear hereinafter.

Referring to the accompanying drawings:

Fig. 1 is a side elevation of an apparatus constructed in accordance with my invention.

Fig. 2 is a section at the line 2—2 on Fig. 1.

Fig. 3 is a fragmentary plan view showing the right-hand portion of the elevating conveyor.

Fig. 4 is a similar view showing the adjoining portions of the conveyors and the means for uprighting the articles.

Fig. 5 is a section at the line 5—5 on Fig. 4.

Referring particularly to Fig. 1, the apparatus comprises an elevating conveyor 10, an uprighting device 11 by which cans or other articles 12 are turned to upright position, and a receiving conveyor 13 on which the articles are received and carried to a station at which they are removed from the apparatus. The apparatus is supported on a framework comprising uprights 14, 15 and 16 and horizontal frame members 17. The conveyor 10 is in the form of an endless belt running over a drive pulley 18 on a drive shaft 19, and a driven pulley 20. The conveyor 13 is of similar construction and is trained over a drive pulley 21 and an idler pulley 22.

The conveyors are driven by a power device 23 which may be an electric motor connected through speed reduction gearing to a sprocket drive wheel 24. Sprocket chain 25 is trained over sprocket wheels including the sprocket 24, a sprocket on the conveyor shaft 19, an idler sprocket 26 and a sprocket 27, the latter having driving connection through a belt 28 with the pulley 21. The articles 12 are fed to the elevating conveyor 10 from a conveyor 30 with the articles lying down on the conveyors and extending transversely of the conveyor belt. Stationary guide rails 31 and 32 (Fig. 3) overlie the elevating conveyor belt and extend along the marginal portions thereof from the lower end of the belt to an intermediate point. The upper end of the guide rail 31 is formed with a hook 33 positioned to engage each work-piece 12 adjacent one end thereof so that it is swung by the drag of the belt from a position in which it extends transversely of the belt to an oriented position in which it extends lengthwise thereof. The guide rail 32 as shown is shortened to release the adjacent end of the can for such swinging movement. When the can is turned lengthwise of the belt it is guided by rails 34 and 35 which are spaced to hold it in such oriented position. The lower end portion 36 of the rail 35 is outwardly inclined as shown and clears the articles as they are being swung on the belt.

The uprighting mechanism includes a vertically disposed shield 37 extending across the conveyor and spaced a short distance in advance of the conveyor belt 10 to provide a passageway for the articles. The shield 37 is formed at opposite sides with wings 38 and is pivotally connected to the conveyor frame by a pivot rod 39. Coil springs 40 yieldingly hold the shield stationary in an upright position.

As the work-pieces 12 pass over the pulley 18 they are swung to an upright position and are guided by the shield 37 as they drop down onto the conveyor 13 beneath. A second shield or guide plate 41 is located over the conveyor 13 in position to prevent the work-pieces from tilting backward after they drop onto the conveyor. The shield 37 terminates at a sufficient distance above the conveyor 13 to clear the work-pieces as they advance with the conveyor.

Referring to Fig. 4 there is provided means for swinging the uprighted cans or work-pieces to a diagonal position on the conveyor belt. Such means includes a stationary lug 42 positioned just in advance of the shield 37 and projecting into position to engage the edge of the can, thereby arresting it so that the can is swung by the drag of the belt to an inclined position in which it is released from the stop lug 42. The articles are thus inclined to give them greater stability as they advance with the conveyor as the forces tending to tip them over as they advance are mainly in the direction of movement of the conveyor.

In order to further stabilize the articles and definitely prevent them from being tipped over as they advance with the conveyor 13, a series of magnets 44 are positioned beneath the upper run of the conveyor. These as shown are permanent magnets arranged in pairs and spaced to extend lengthwise of the conveyor beneath the edge portions of the cans which may be made of or comprise sheet iron. Electromagnets could be used if desired, but I have found that permanent magnets are efficient for the purpose specified.

The cans 12 while they advance with the conveyor 13 are in spaced relation until arrested by the forward end of the conveyor frame. Here they accumulate permitting them to be removed manually in groups. The arrangement of the uprighted articles in groups as herein disclosed greatly facilitates the handling of the articles as ordinarily they are supplied in rapid succession by the high speed conveyor 30.

Modifications may be resorted to within the spirit and scope of my invention.

I claim:

1. The combination of an endless belt conveyor, a pulley over which said conveyor is trained, means for driving the conveyor and causing articles lying thereon to be discharged over said pulley, a second endless belt conveyor extending beneath said pulley in position to receive the articles discharged thereover, uprighting means cooperating with said pulley for guiding the articles to an upright position on said second conveyor, said uprighting means comprising a vertically disposed shield spaced in advance of said pulley, the lower end of said shield being spaced above said second conveyor to clear the articles as they advance with the conveyor, and a stationary upright shield positioned over said second conveyor below and spaced a short distance behind said first mentioned shield in position to prevent the articles from tilting over backward as they are received on the second conveyor, and means positioned and arranged to engage the articles before they have been carried beyond the control of said stationary shield, to swing the articles to a diagonal position on the said second conveyor.

2. The combination of an endless belt conveyor, a pulley over which said conveyor is trained, means for driving the conveyor and causing articles lying thereon to be discharged over said pulley, a second endless belt conveyor extending beneath said pulley in position to receive the articles discharged thereover, uprighting means cooperating with said pulley for guiding the articles to an upright position on said second conveyor, said uprighting means comprising a vertically disposed shield spaced in advance of said pulley, the lower end of said shield being spaced above said second conveyor to clear the articles as they advance with the conveyor, and a stationary upright shield positioned over said second conveyor below and spaced a short distance behind said first mentioned shield in position to prevent the articles from tilting over backward as they are received on the second conveyor, and a stop lug positioned over said second conveyor and projecting into the path of said articles at a point to be engaged by each article before the latter advances beyond the control of said stationary shield and thereby causing each article to be swung by the drag thereon of the conveyor to a diagonal position in which it clears the stop device.

3. The combination of an endless belt conveyor, a pulley over which said conveyor is trained, means for driving the conveyor and causing articles lying thereon to be discharged over said pulley, a second conveyor extending beneath said pulley in position to receive the articles discharged thereover, uprighting means cooperating with said pulley for guiding the articles to an upright position on said second conveyor, a vertically disposed stationary shield positioned over the second conveyor and arranged and positioned to prevent the articles from tipping over as they are received on the second conveyor, and means to swing the articles horizontally to an inclined position before they have been carried by the second conveyor beyond the control of said shield.

4. The combination of an endless belt conveyor, a pulley over which said conveyor is trained, means for driving the conveyor and causing articles lying thereon to be discharged over said pulley, a second conveyor extending beneath said pulley in position to receive the articles discharged thereover, uprighting means cooperating with said pulley for guiding the articles to an upright position on said second conveyor, a vertically disposed stationary shield positioned over the second conveyor and arranged and positioned to prevent the articles from tipping over as they are received on the second conveyor, and a stationary stop device projecting into the path of the articles at a point a short distance in advance of said shield in a position to engage the articles before they have passed beyond the control of said shield and cause them to be swung by the drag of the conveyor, to a diagonal position thereon.

5. The combination of an endless belt conveyor, a pulley over which said conveyor is trained, means for driving the conveyor and causing flat articles with elongated bases, carried on said conveyor, to be discharged over said pulley, means for guiding and holding the articles with said bases extending transversely of the conveyor, a second conveyor extending beneath said pulley in position to receive the articles discharged thereover, uprighting means cooperating with said pulley for guiding the articles to an upright position on said second conveyor with their elongated bases extending transversely of said second conveyor, said uprighting means comprising a vertically disposed shield spaced in advance of the pulley, a second vertically disposed shield positioned over the second conveyor rearwardly of said first shield in position to prevent rearward tilting of the articles as they are placed on the second conveyor, and means positioned and arranged to engage the articles before they have been carried beyond the control of said second shield and swing them as they are carried forward from said second shield, to a position in which said bases extend diagonally across the conveyor and thereby stabilizing the articles.

6. The combination of an endless belt conveyor, a pulley over which said conveyor is trained, means for driving the conveyor and causing articles lying thereon to be discharged over said pulley, a second conveyor extending beneath said pulley in position to receive the articles discharged thereover, uprighting means spaced forwardly of and cooperating with said pulley for guiding the articles to an upright position on said second conveyor, a vertically disposed stationary shield positioned over the second conveyor behind the path of movement of the articles onto the second conveyor and arranged to prevent the articles from tipping over as they are received on the second conveyor, means to swing the articles horizontally to an inclined position before they have been carried by the second conveyor beyond the control of said shield, and electromagnets beneath said second conveyor and extending therealong in position to exert a downward magnetic pull on the articles as they advance beyond the control of said shield.

7. The combination of a belt conveyor extending in an approximately horizontal direction, means for driving the conveyor, stationary guiding means positioned over said conveyor for guiding flat articles with elongated bases downwardly onto the conveyor with the bases extending crosswise of the conveyor, said guiding means being spaced above the conveyor to permit the articles to advance with the conveyor, a vertically-disposed shield positioned over the conveyor rearwardly of said guiding means in position to prevent rearward tipping over of the articles as they are positioned on the conveyor, and means positioned and arranged to engage the articles before they have been carried beyond the control of said shield and thereby cause them to be swung to a position in which their bases extend diagonally across the conveyor and thereby stabilizing the articles.

LOUIS HERMANI.